(12) United States Patent
Wang

(10) Patent No.: US 9,524,262 B2
(45) Date of Patent: Dec. 20, 2016

(54) CONNECTING EXPANSION SLOTS

(75) Inventor: Chin-Yu Wang, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 14/233,970

(22) PCT Filed: Aug. 18, 2011

(86) PCT No.: PCT/US2011/048286
§ 371 (c)(1),
(2), (4) Date: Jan. 21, 2014

(87) PCT Pub. No.: WO2013/025221
PCT Pub. Date: Feb. 21, 2013

(65) Prior Publication Data
US 2014/0223064 A1  Aug. 7, 2014

(51) Int. Cl.
*G06F 13/00* (2006.01)
*G06F 13/40* (2006.01)
*G06F 13/38* (2006.01)
*G06F 1/18* (2006.01)

(52) U.S. Cl.
CPC ....... *G06F 13/4022* (2013.01); *G06F 13/4027* (2013.01); *G06F 13/4068* (2013.01); *G06F 1/185* (2013.01); *G06F 13/387* (2013.01); *G06F 2213/0026* (2013.01)

(58) Field of Classification Search
CPC .............. G06F 13/4022; G06F 13/4068; G06F 2213/0026; G06F 13/4027; G06F 13/4045; G06F 13/4063; G06F 13/4004; G06F 1/185

USPC .......................................................... 710/301
See application file for complete search history.

(56) References Cited

U.S. PATENT DOCUMENTS

| | | | |
|---|---|---|---|
| 7,095,415 B2 | 8/2006 | Chang et al. | |
| 7,657,688 B2 | 2/2010 | Atherton et al. | |
| 7,836,238 B2 | 11/2010 | Freimuth et al. | |
| 2003/0126346 A1 | 7/2003 | Kuo | |
| 2005/0017980 A1* | 1/2005 | Chang | G06F 3/14 345/520 |
| 2006/0041703 A1* | 2/2006 | Tseng | G06F 13/387 710/306 |
| 2006/0294279 A1 | 12/2006 | McKee et al. | |
| 2007/0043972 A1* | 2/2007 | Graham | G06F 11/1662 714/12 |
| 2007/0214301 A1 | 9/2007 | Chen | |
| 2007/0234118 A1 | 10/2007 | Sardella et al. | |
| 2009/0063741 A1 | 3/2009 | Lu | |

OTHER PUBLICATIONS

International Searching Authority, Appl No. PCT/US2011/048286, filed Aug. 18, 2011, Search Report and Written Opinion, 10pp, dated Apr. 10, 2012.

* cited by examiner

*Primary Examiner* — Ernest Unelus
(74) *Attorney, Agent, or Firm* — HP Inc. Patent Department

(57) ABSTRACT

Example embodiments disclosed herein relate to selectively connecting an interconnect bus to an expansion slot. A first chip is connected to a first interconnect bus. A second chip is connected to a second interconnect bus. A switch selectively connects the first interconnect bus to one of a plurality of expansion slots.

18 Claims, 3 Drawing Sheets

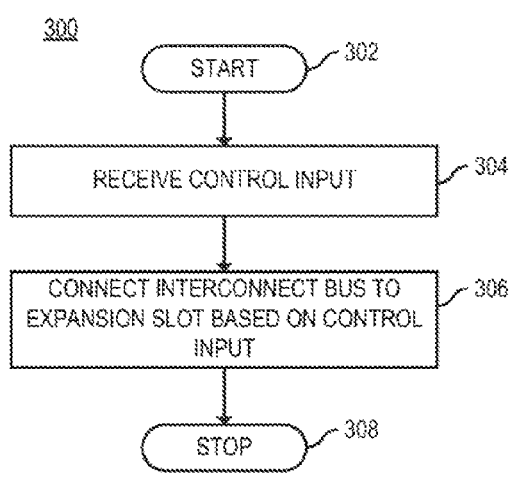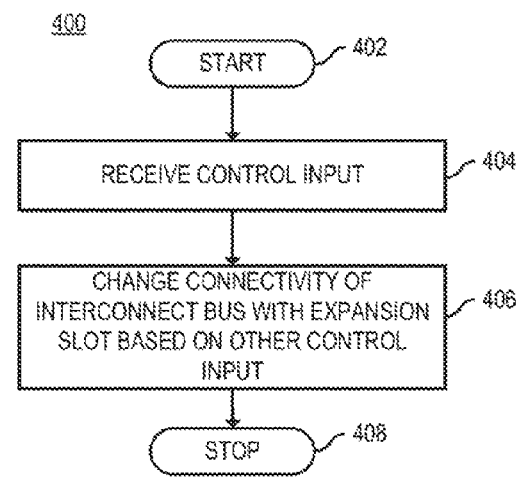
*FIG. 3*  *FIG. 4*

CONNECTING EXPANSION SLOTS

BACKGROUND

Manufacturers of computing devices provide for expansion of the devices using expansion ports. For example, Peripheral Component Interconnect (PCI) buses, PCI Express (PCIe), Accelerated Graphics Port (AGP), or other like standards can be used for expansion of the computing devices. These expansion ports can be used by adapter cards to provide graphics, network connections, audio, etc.

BRIEF DESCRIPTION OF THE DRAWINGS

The following detailed description references the drawings, wherein:

FIG. 3 is a flowchart of a method for connecting an interconnect bus to an expansion slot based on a control signal, according to one example; and FIG. 4 is a flowchart of a method for rerouting interconnect buses to expansion slots based on control signals, according to one example.

DETAILED DESCRIPTION

Figure 1:
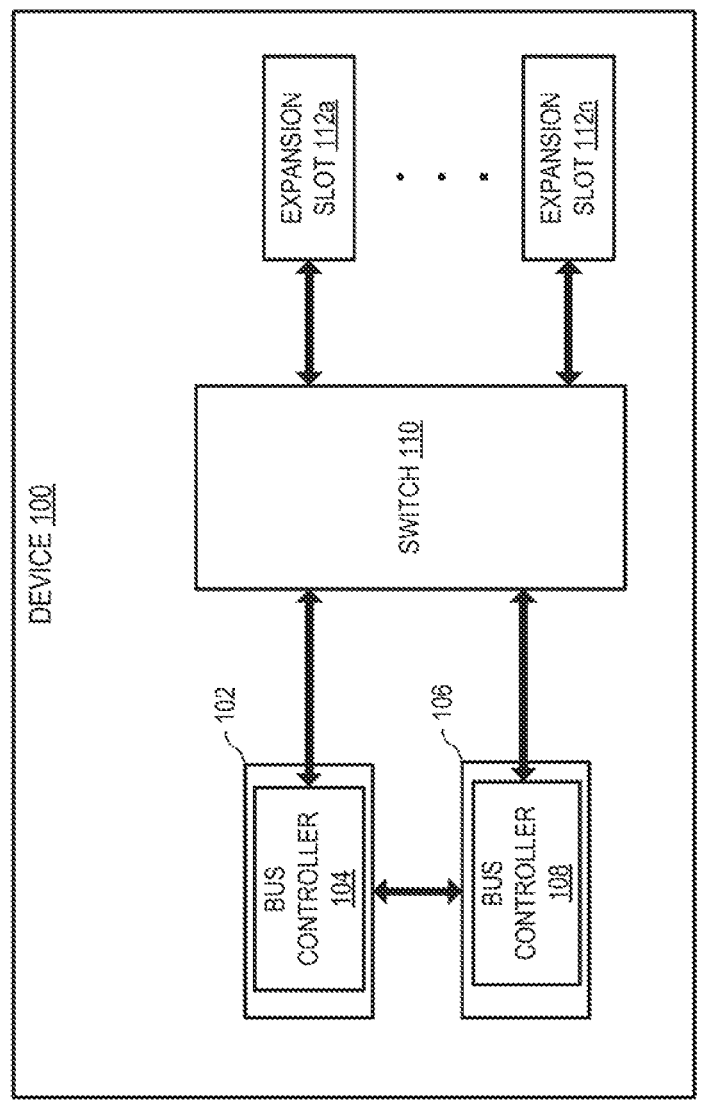
FIG. 1 is a block diagram of a device capable of rerouting interconnect buses to expansion slots, according to one example.

As detailed above, computing devices include various types of connections to expand the capabilities of the computing devices. These connections can be connected to a processor via one or more chipsets on one side and one or more hardware devices via buses (e.g., a PCI bus, a PCIe bus, an AGP bus, etc.) on the other side. The hardware devices can include expansion cards as well as integrated circuits that are fitted into the system board. The expansion cards can be connected to a bus via an expansion slot or connector.

For explanatory purposes, throughout this specification, a PCIe bus is used, however, it is contemplated that other buses can be used. In certain embodiments, a PCIe bus is a computer expansion subsystem that transfers data between components inside a computer. A PCIe bus can also conform to one or more PCI Express standards, for example, the PCI Express 3.0 specification. Further, the PCIe slots can be a standard size for desktop computers or laptop devices (e.g., ExpressCard) or a non-standard size. As an interconnect bus, PCIe devices communicate via a logical connection named a link or interconnect. A link is a point-to-point communication channel between two PCIe ports/interfaces. PCIe devices can communicate via lanes. A lane includes a transmit and receive pair of differential lines. Multiple lanes can be used to transmit information between a chipset and a hardware device.

PCIe controllers can be located on multiple chips of a computing device. For example, a PCIe controller can be located on a Northbridge and on a Southbridge. In certain examples, the Northbridge is a chip directly connected to a processing core (e.g., one or more central processing units (CPUs)) while the Southbridge is connected to the processing core via another chipset (e.g., the Northbridge). Further, the Northbridge can include a memory controller that provides access to memory (e.g., Random Access Memory (RAM)). The Northbridge, in certain embodiments, can also be integrated into a processor chip including one or more cores of the computing device.

Because the Northbridge is closer to the CPU and/or memory, PCIe executing on the Northbridge may be faster than PCIe executing on the Southbridge. As such, many times, a fast PCIe card, such as a graphics card, a network card (e.g., a Gigabit Ethernet adapter), a storage adapter card (e.g., a Fibre Channel adapter, a hard driver controller card, etc.), or the like, is connected to the Northbridge. However, the number of PCIe buses or lanes available at the Northbridge may be limited compared to the number of fast cards a user may wish to use with the computing device. As such, a single device or a set of devices may have access to the controller on the Northbridge, while other devices would receive slower speed access via the Southbridge. In certain scenarios, a user may wish to have access to choose which of the cards to associate with the Northbridge.

Accordingly, various embodiments disclosed herein relate to selectively connecting an interconnect bus associated with the Northbridge to a first expansion card/slot at a first time and a second expansion card/slot at another time. For example, in working hours, a graphics card can be routed to the Northbridge for better visual performance while at other times, network cards and/or storage cards can be routed to the Northbridge to provide better network performance at other times. This can be accomplished by using a switch to connect the bus of the Northbridge to one of a plurality of expansion slots/devices. Further, this can be accomplished by connecting one or more buses of the Southbridge to the switch or another switch that can connect the buses to the expansion slots/devices. As such, a user need not open the computing device chassis and physically switch expansion cards to perform the same functionality.

FIG. 1 is a block diagram of a device capable of rerouting interconnect buses to expansion slots, according to one example. The device 100 may be, for example, a workstation, a desktop computer, a notebook computer, a slate computing device, or any other computing device. The device 100 includes a first chip 102 that includes a bus controller 104 that controls a first interconnect bus. The device 100 also includes a second chip 106 that includes another bus controller 108 that controls a second interconnect bus. The interconnect buses can be parallel (e.g., PCI or PCI-X buses) or serial (e.g., PCIe bus). Additional interconnect buses (e.g., a third interconnect bus) can be included and controlled by one of the bus controllers. The interconnect buses can connect to a switch 110 that can selectively connect the respective interconnect buses to one or more expansion slots 112a-112n and/or hardware devices.

Further, the interconnect buses can be used to connect one or more peripheral devices to a processor of the device 100. The processor may be at least one central processing unit (CPU), at least one semiconductor-based microprocessor, at least one graphics processing unit (GPU), other hardware devices suitable for retrieval and execution of instructions stored in a machine-readable storage medium, or combinations thereof. For example, the processor may include multiple cores on a chip, include multiple cores across multiple chips, or a combination thereof. The processor may fetch, decode, and execute instructions to implement tasks. As an alternative or in addition to retrieving and executing instructions, the processor may include at least one integrated circuit (IC), other control logic, other electronic circuits, or combinations thereof that include a number of electronic components for performing the functionality of instructions.

A machine-readable storage medium may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium may be encoded with a series of executable instructions for selectively connecting the interconnect buses to hardware devices.

The first chip 102 and the second chip 106 can be connected to each other via another bus. This bus can be based on a standard or be a proprietary interface, for example, a Direct Media Interface (DMI), a Hub interface, an Enterprise Southbridge Interface (ESI), etc.

In one embodiment, the switch 110 couples the first interconnect bus with a first expansion slot 112a. This coupling can be based on a control signal received at the switch 110. As such any of expansion slots 112a-112n can be connected to the first interconnect bus. The control signal can be received from another controller or logic. For example, a Basic Input Output System (BIOS) can be used to set the switch 110. In other examples, the switch 110 can couple the first interconnect bus with other expansion slots 112. Further, the switch 110 may connect the second interconnect bus, the third interconnect bus, or the like with one or more of the expansion slots 112a-112n. As such, the switch can be configured to connect the second interconnect bus to a second one of the expansion slots. Moreover, the second chip 106 can include a third interconnect bus, where the switch 110 can connect the third interconnect bus to another one of the expansion slots 112. The buses can be connected in a manner such that each bus is connected to one expansion slot 112 or no expansion slot 112. Depending on the type of bus, this can be used to ensure that multiple buses are not attempting to communicate with the same expansion slot 112. Moreover, the switch 110 can be implemented using one or more multiplexers and/or demultiplexers.

In certain examples, the first chip 102 can be a Northbridge. Further, the first chip 102 can include a memory controller. As noted above, a memory controller on the first chip 102 can increase the performance of the first interconnect bus. Moreover, the first chip 102 can be directly coupled to a central processing, unit of the device 100. This can allow for the first interconnect bus to be faster than buses connected via the second chip 106 because of a more direct connection. This direct connection can further reduce any latency caused by interacting with the second chip 106. Additionally or alternatively, the first chip 102 can include the central processing unit and/or multiple cores of processors, further increasing the performance of the bus.

In certain embodiments, selectively connecting an interconnect bus to one or more expansion slots 112 means that the expansion slot that the interconnect bus is connected to can be changed. This can occur dynamically (e.g., via a PCI Hot-Plug system) or during boot of the device 100. For example, the BIOS can be set in a manner such that when the device 100 is booted at a particular time or time frame, a different control signal will be sent to the switch. Additionally or alternatively, in the case of a Hot-Plug system, the devices can be shut down and then the switch can change the bus paths. In certain examples, the buses include data and/or communications channels. In these examples, other signals, such as power, need not be rerouted. As such, in the example of PCIe, the switch 110 can control the routing of one or more lanes controlled by the respective bus controllers 104, 108.

With this approach, a user can install multiple devices into the expansion slots 112a-112n and can change the routing of the devices without changing the installation of cards using the expansion slots 112a-112n. As such, the user can put a graphics card in one expansion slot 112a and a fast network card in another expansion slot 112n. The user can select to have the graphics card connected to the first interconnect bus for a portion of time and have the fast network card or another card connected to the first interconnect bus for other portions of time.

Figure 2:
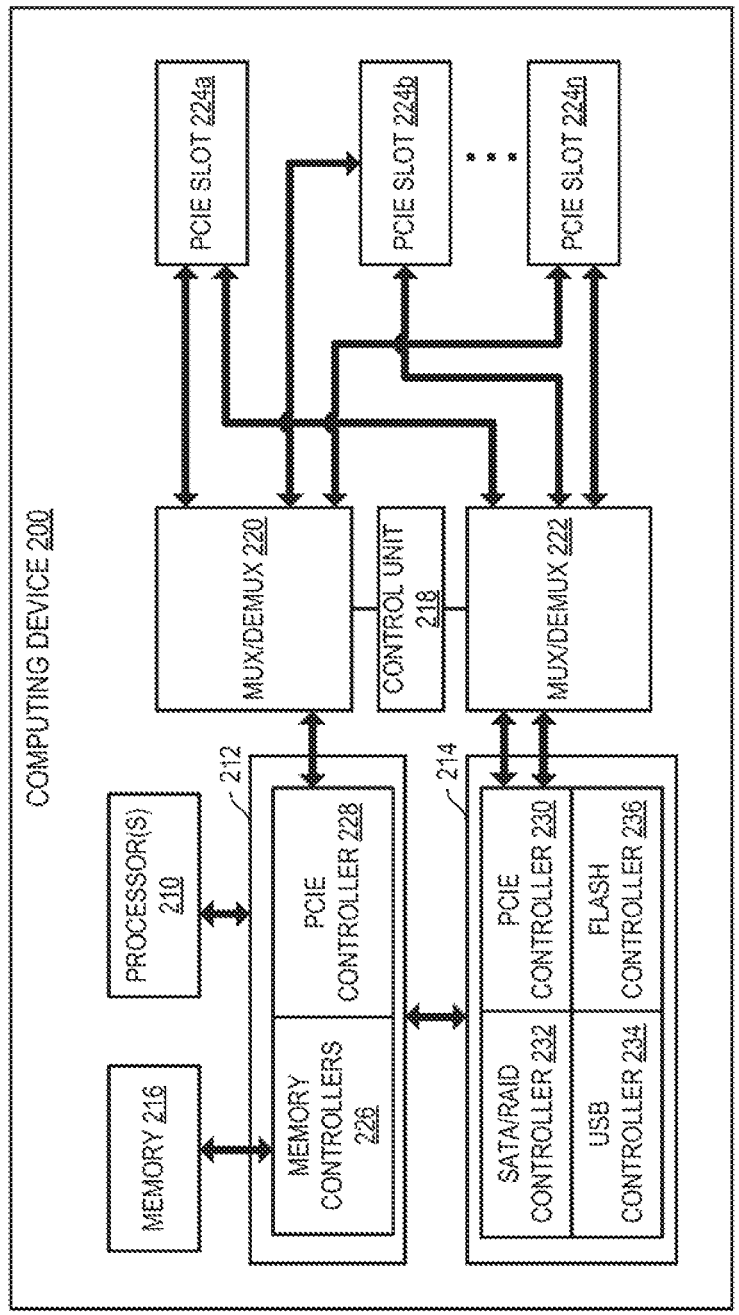
FIG. 2 is a block diagram of a computing device capable of rerouting Peripheral Component Interconnect buses, according to one example.

FIG. 2 is a block diagram of a computing device capable of rerouting Peripheral Component Interconnect buses, according to one example. In this example, the computing device 200 includes a processor 210, a Northbridge chip 212, a Southbridge chip 214, memory 216, a control unit 218, multiplexers and/or demultiplexers (Mux/Demux) 220, 222, and a plurality of PCIe slots 224a-224n. As noted above, the processor(s) 210 can include one or more CPUs or cores. Further, in certain examples, the processor 210 can be included as part of the Northbridge chip 212 and/or may include the Northbridge chip operations on the processor 210.

The Northbridge chip 212 can include one or more memory controllers 226. In certain examples, a memory controller is a digital circuit that manages a data flow between the processor(s) 210 and the main memory 216. Further, the Northbridge chip 212 can include a PCIe controller 228. The PCIe controller 228 can be selectively connected to one of the PCIe slots 224 based on input from a control unit 218.

The Southbridge chip 214 can be connected to the Northbridge chip 212 via another bus, for example, a Direct Media Interface (DMI), a Hub interface, an Enterprise Southbridge Interface (ESI), or the like. The Southbridge chip 214 can include another PCIe controller 230. The Southbridge chip 214 can also include other I/O controllers and/or other logic. For example, the Southbridge chip 214 can include a Serial Advanced Technology Attachment (SATA) controller and/or a Redundant Array of Independent Disks (RAID) controller 232, a Universal Serial Bus (USB) 234 controller, a flash controller 236 to control flash memory, etc.

The PCIe controller 230 of the Southbridge chip 214 can include one or more buses that can also be respectively connected the PCIe slots 224a-224n based on a control signal from the control unit 218. As such, the buses of the Northbridge PCIe controller 228 and the Southbridge PCIe controller 230 can each be connected to at least one Mux/Demux 220, 222. In certain examples, PCIe slots 224 are connections between PCIe buses and hardware devices (e.g., a graphics card, a network card, etc.). PCIe slots can be compatible with one or more PCIe standard versions. Further, the PCIe slots can be in different form factors. For example, a standard slot may include a x1, x2, x4, x8, x16, x32, etc. form factor. Further, the form factor can be smaller, for example, to provide for a PCIe Mini Card and/or ExpressCard.

Because the Mux/Demux 220, 222 is connected to the PCIe buses as well as the PCIe slots 224, a control signal from the control unit 218 can be used to control which PCIe slot(s) 224a-224n is associated with the Northbridge PCIe controller 228 and which PCIe slot(s) are associated with the Southbridge PCIe controller 230. As such, the Mux/Demux 220, 222 can dynamically select one of the PCIe slots 224 (e.g., connectors) to connect the bus associated with the Northbridge PCIe controller 228 based on the control input received by the control unit 218.

The control unit 218 can be implemented using control logic (e.g., output from a processor/controller, a Field-Programmable Gate Array (FPGA), a Complex Programmable Logic Device (CPLD), combinations thereof, etc.). Further, the control unit 218 can be part of a BIOS and/or a Hot-Plug system. A Hot-Plug system can be used to dynamically change which PCIe slot 224a-224n is connected to the Northbridge PCIe controller 228. As noted, a PCIe hardware device connected to the Northbridge PCIe controller 228 can have a better performance rating than one connected via the Southbridge chip 214. In certain scenarios, the BIOS can have a setting in which the PCIe slots 224a-224n are set up differently based on times (e.g., a first configuration between a working time period, a second configuration after hours, etc.), based on user input, or the like.

The control unit 218 can be used to control the Mux/Demux 220, 222. Further, the control unit 218 can send signals in a manner such that the individual PCIe buses associated with the chips can be routed to one or more of the PCIe slots 224. As such, the Mux/Demux can dynamically select, based on the control unit input, which of the PCIe slots 224 to connect to the PCIe buses. In certain examples, some of the PCIe slots 224 can be unconnected to one of the buses. In other examples, each of the PCIe slots 224 are connected to at least one of the PCIe controllers 228, 230. Moreover, as noted above, the Mux/Demux 220, 222 can receive another control input from the control unit 218. This can occur at boot (e.g., using BIOS as control of the control unit 218) or at another time (e.g., using a Hot-Plug system). As such, the Mux/Demux 220, 222 can select another one of the PCIe connectors to associate with the Northbridge PCIe controller 228 and/or the Southbridge PCIe controller 230. In certain examples, the control unit 218 can be implemented as a General Purpose Input/Output (GPIO). The GPIO can be powered by a standby power and/or an alternate source.

As noted above, the current example is directed towards PCIe, however, it is contemplated that other buses can be implemented using this approach. Further, to compensate for routing requirements, routing of some of the connections between the Mux/Demux 220, 222 and the PCIe slots 224 can be included within a chip (e.g., the Mux/Demux 220, 222). Moreover, a single Mux/Demux 220, 222 can be used for each of the PCIe controllers 228. Additionally or alternatively, the Mux/Demux 220, 222 can be implemented as a switch. Further, delays within the Mux/Demux 220, 222 can be compensated by changes to path sizes between the Mux/Demux 220, 222 and the PCIe slots 224 and/or PCIe controllers 228, 230. Further, the connections between the Mux/Demux 220, 222 and each of the PCIe slots 224 can be the same routing distance or within a routing distance range. In certain examples, additional PCIe controllers can be used as well (e.g., connected via the Northbridge chip 212 and/or Southbridge chip 214).

FIG. 3 is a flowchart of a method for connecting an interconnect bus to an expansion slot based on a control signal, according to one example. Although execution of method 300 is described below with reference to device 100, other suitable components for execution of method 300 can be utilized (e.g., computing device 200). Method 300 may be implemented in the form of executable instructions stored on a machine-readable storage medium, and/or in the form of electronic circuitry.

Method 300 may start at 302 and proceed to 304, where a switch 110 receives a control input associating a first interconnect bus and a first one of a plurality of expansion slots 112a-112n. In this example, the first interconnect bus can be connected to a first interconnect bus controller chip (e.g., chip 102 including bus controller 104). The control input can further associate a second interconnect bus and a second one of the expansion slots 112a-112n. The second interconnect bus can be connected to a second interconnect bus controller chip (e.g., chip 106 connected to bus controller 108).

The switch 110 can then connect the first interconnect bus to the first expansion slot based on the control signal (at 306). In this example, the first expansion slot can be any one of the expansion slots 112a-112n. Further, the second interconnect bus can be selectively connected to a second one of the expansion slots 112. In certain examples, the first expansion slot and the second expansion slot are different. Further, additional buses can be used on one or more of the chips 102, 106 and/or on additional chips. The switch 110 can be associated with configurations of which expansion slots 112 to associate with which bus controllers (e.g., based on a lookup table). Further the switch 110 can be implemented using one or more control logic chips (e.g., muxes, demuxes, CPLDs, FPGAs, etc.). Method 300 stops at 308. The switch 110 can continue to perform based on the routings associated with the control input or change based on a change to the control input.

FIG. 4 is a flowchart of a method for rerouting interconnect buses to expansion slots based on control signals, according to one example. Although execution of method 400 is described below with reference to device 100, other suitable components for execution of method 400 can be utilized (e.g., computing device 200). Method 400 may be implemented in the form of executable instructions stored on a machine-readable storage medium, and/or in the form of electronic circuitry.

Method 400 can start at 402 and be in a state where method 300 stopped 308. Method 400 can proceed to 404, where the switch 110 receives a second control input that associates the first interconnect bus with a second one of the expansion slots 112a-112n.

In one example, the control input is received during a boot process of the device 100. As such, one control input is received at the switch 110 during boot and the switch 110 is configured at that time. The control signal can be set at boot time (e.g., by a BIOS). Further, the BIOS can be used to change the setting. In another example, the control input is received as part of a Hot-Plug process and change. The first one of the expansion slots can be shut down by software executing on a processor of the device 100.

At 406 the switch changes connectivity of the interconnect buses with the expansion slots based on the received control input. After a change in input control signal is received and acknowledged, the switch 110 disconnects the first interconnect bus from the first expansion slot. The changed input control signal can be acknowledged at one or more times in a Hot-Plug system and/or acknowledged during a system boot and/or reboot. In various scenarios, the acknowledgement and action based on the changed input control signal can occur at different times.

In this scenario, the first interconnect bus can be connected to a second one of the expansion slots based on the received control input. Further, in this scenario, the received control input can associate a second interconnect bus with the first expansion slot. As such, the second interconnect bus can be connected to the first expansion slot. Then, at 408, the method 400 stops. Other computing processes can continue.

As noted above, the switching of connectivity of interconnect buses to expansion slots can be because performance can be enhanced when an expansion card is connected to one interconnect bus controller chip than another. This can be because one of the interconnect bus controller chips includes a memory controller and/or has closer access to the processor.

With the above approaches, performance of one or more expansion cards of a system can be improved based on location without need for physically moving the expansion cards. A user may desire to have a video card connected to a faster performing expansion bus when the user is actively using the system. Further, a user/business entity may wish to have a fast Ethernet card or other I/O card (e.g., a storage card) connected to the faster performing expansion bus when the user is not actively using the system. This can occur, for example, if the entity would like to use the computing device as in a cluster during off hours. As such, a timing mechanism can be used to dynamically change the routing connections between expansion bus chips and expansion bus slots.

What is claimed is:

1. A device comprising: a northbridge to couple to a processor, the northbridge including a memory controller and a first Peripheral Component Interconnect Express controller directly connected to a first bus; a southbridge coupled to the northbridge, the southbridge including a second Peripheral Component Interconnect Express controller directly connected to a second bus and a third bus, wherein the northbridge and the southbridge are directly connected by a fourth bus; a plurality of expansion slots; and a switch directly connected to the first bus, the second bus, the third bus, and the plurality of expansion slots, the switch to selectively connect a first one of the expansion slots directly to the first bus and the second bus.

2. The device of claim 1, wherein the northbridge includes a memory controller.

3. The device of claim 1, further comprising: a central processing unit, wherein the northbridge is directly coupled to the central processing unit.

4. The device of claim 1, wherein the switch is to connect the southbridge to a second one of the expansion slots.

5. The device of claim 4, wherein the switch is to connect the southbridge to a third one of the expansion slots.

6. The device of claim 1, wherein the switch is to receive a control signal indicating to which of the northbridge and the southbridge the first one of the expansion slots should be connected.

7. The device of claim 1, wherein the switch includes one or more demultiplexers.

8. The device of claim 1, wherein the plurality of expansion slots are a plurality of Peripheral Component Interconnect Express expansion slots.

9. A method comprising: receiving a control input associating a first interconnect bus and a first one of a plurality of expansion slots, wherein the first interconnect bus is directly connected to a first interconnect bus controller, a northbridge comprising the first interconnect bus controller and a memory controller, wherein the control input further associating a second interconnect bus and a second one of the expansion slots, wherein the second interconnect bus and a third interconnect bus are directly connected to a second interconnect bus controller, a southbridge comprising the second interconnect bus controller, wherein the northbridge and the southbridge are directly connected by a fourth bus; and selectively connecting the first interconnect bus and the second interconnect bus via a switch directly to the first one expansion slot based on the control input, wherein the switch is directly connected to the first interconnect bus, the second interconnect bus, the third interconnect bus, and the plurality of expansion slots.

10. The method of claim 9, further comprising: receiving a second control input that associates the first interconnect bus with the second one of the expansion slots; and connecting the first interconnect bus to the second one expansion slot based on the second control input.

11. The method of claim 10, further comprising: disconnecting the first interconnect bus from the first one expansion slot, wherein the second control input further associates the second interconnect bus with the first one expansion slot, and connecting the second interconnect bus to the first one expansion slot.

12. The method of claim 9, wherein the first interconnect bus controller chip further includes a memory controller.

13. A computing device comprising: a northbridge chip including a memory controller and a first Peripheral Component Interconnect Express controller directly connected to a first bus; a southbridge chip including a second Peripheral Component Interconnect Express controller directly connected to a second bus and a third bus, wherein the northbridge chip and the southbridge chip are directly connected by a fourth bus, wherein the first bus, the second bus, and the third bus are connected directly to at least one multiplexer/demultiplexer; and a plurality of Peripheral Component Interconnect Express connectors directly connected to the at least one multiplexer/demultiplexer, wherein the multiplexer/demultiplexer is to dynamically select one of the Peripheral Component Interconnect Express connectors to connect directly to the first bus and the second bus based on a control input.

14. The computing device of claim 13, wherein the multiplexer/demultiplexer is to dynamically select a second one and a third one of the Peripheral Component Interconnect Express connectors to respectively connect to the second bus and the third bus based on the control input.

15. The computing device of claim 13, wherein the multiplexer/demultiplexer is to receive another control input and wherein the multiplexer/demultiplexer is to select another one of the Peripheral Component Interconnect Express connectors to connect to the first bus based on the other control input.

16. The device of claim 1, wherein the switch is to change dynamically to which of the northbridge and the southbridge the switch is connected without rebooting the device.

17. The method of claim 10, wherein connecting the first interconnect bus to the second one of the expansion slots comprises: shutting down a card coupled to the second one of the expansion slots; switching the second one of the expansion slots from the second interconnect bus to the first interconnect bus; and restarting the card coupled to the second one of the expansion slots.

18. The method of claim 17, further comprising acknowledging the second control input before switching the second one of the expansion slots.

* * * * *